Dec. 11, 1962  H. A. BERLINER  3,068,024
BOAT TRAILER
Filed Jan. 7, 1960  2 Sheets-Sheet 2

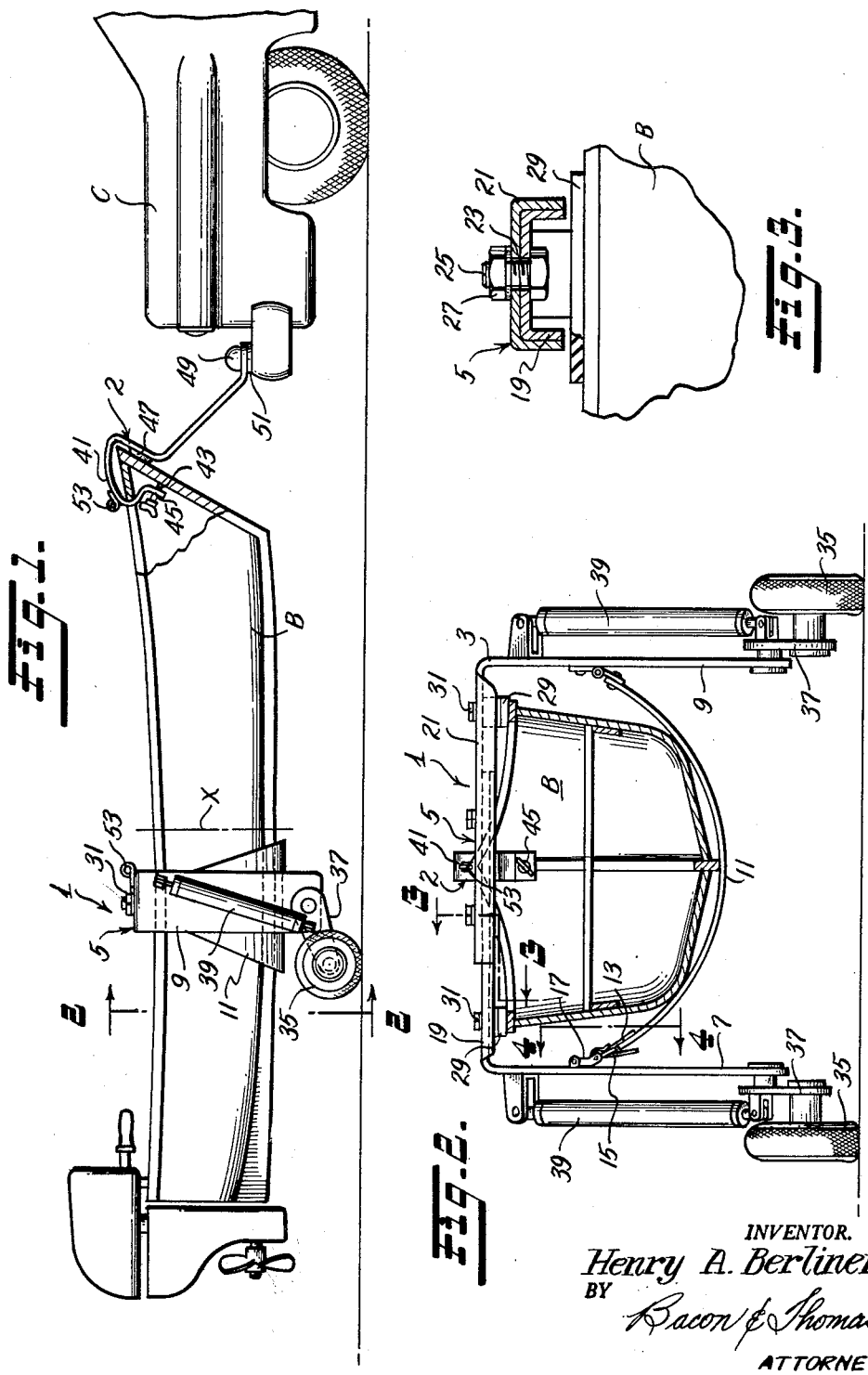

INVENTOR.
Henry A. Berliner
BY
Bacon & Thomas
ATTORNEYS

United States Patent Office 3,068,024
Patented Dec. 11, 1962

3,068,024
BOAT TRAILER
Henry A. Berliner, 2841 Tilden St. NW.,
Washington, D.C.
Filed Jan. 7, 1960, Ser. No. 962
2 Claims. (Cl. 280—414)

This invention relates generally to load-carrying trailer means and, more particularly, to means specifically designed for hauling small boats or the like behind a towing vehicle, such as a car or truck.

The boat trailer of the present invention is specifically designed to support the boat firmly, to absorb the impact of jarring in transit, and to protect the load to the fullest extent from the wear and tear of normal towing operations.

Another object of the invention is to provide boat trailer means which are rigid and compact in construction and which may be folded to facilitate storage when not in use.

Another object of the invention is to provide boat trailer means which can be readily adapted to support boats or other loads of different shapes and sizes.

Another object of the invention is to provide a boat trailer which is economical in construction and durable in use.

Other objects and advantages will be apparent from the following specification when taken in conjunction with the accompanying drawings, in which:

FIG. 1 is an elevational view of a boat trailer constructed in accordance with the present invention. The device being shown in use here with a boat and a vehicle, certain portions of the drawing being broken away to illustrate structural details;

FIG. 2 is a sectional view taken on the line 2—2 of FIG. 1, presenting a rear view of the trailer structure;

FIG. 3 is an enlarged sectional view taken on the line 3—3 of FIG. 2;

Figure 4:
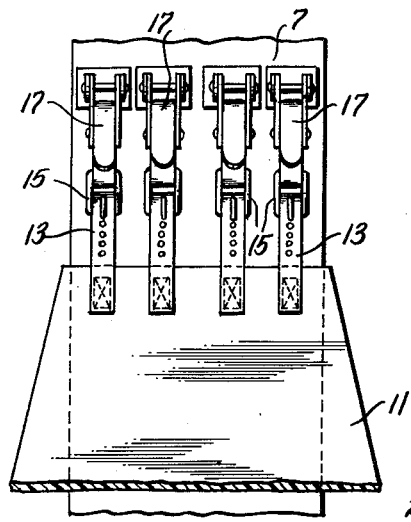
FIG. 4 is an enlarged sectional view taken on the line 4—4 of FIG. 2.

Referring now more specifically to the drawings, the boat trailer of the present invention comprises two essential portions: a boat cradling and supporting assembly, generally indicated by the numeral 1, and a bumper-attached towing assembly, generally indicated by the numeral 2. The assembly is wheeled and is adapted to support a boat B centrally thereof or slightly to the rear of its center of gravity, which has been indicated by the line X. The towing attachment 2 is adapted to be clamped at the bow of the boat B and to be secured to the rear bumper of a car C or other towing vehicle.

The assembly 1 comprises a U-shaped frame 3, which may be formed of any suitable material, such as aluminum or the like, which is sufficiently rigid and durable. Frame 3 comprises a bight portion 5 and downwardly extending legs 7 and 9. A sling member 11 is suitably secured at one end to the inner wall of leg 9 at a point spaced several inches below bight portion 5. The sling portion of member 11 may be formed of nylon mesh or any other strong flexible material, and terminates in a plurality of apertured straps 13 at its opposite end. The straps 13 are, in turn, adapted to be received in buckles 15, connected with the inner surface of leg 7 in opposed relation with respect to the connection of the opposite end of sling 11. The buckles 15 may be combined with toggle-type strap tighteners 17 so that the boat may be firmly clamped in position.

Bight portion 5 may comprise telescoping generally U-shaped sections 19 and 21 to permit lateral adjustment. Apertures 23, provided in sections 19 and 21, permit the insertion of bolts 25 secured by nuts 27 to keep the assembly in adjusted relation.

A pair of buffer pads 29 are mounted beneath the bight portion 5 at either side thereof to receive the upper edge of the boat and provide a cushion between it and the bight portion. These pads 29 may be adjustably secured to the bight portion by nuts 31.

Wheels 35 may be mounted adjacent the lower end of each leg in any suitable manner. One example is illustrated in the embodiment of FIGS. 1–4 where pivotal links 37 serve to mount the wheels and a shock-absorbing strut 39 is employed.

The towing attachment 2 consists of a goose-necked member 41 having its rearmost portions adapted to lie along the rear wall of the bow of the boat as indicated at numeral 43. A clamp 45 is provided, and suitable padding may be employed to prevent damage to the boat. A member 41 curves over the bow to the front surface thereof, and again suitable pads or cushions can be employed, as indicated at 47, to prevent damage to the boat. The forward end of towing attachment 2 comprises a socket member 49 adapted to form a universal connection with a conventional bumper attachment 51.

The frame 1 and towing attachment 2 may both be provided with eyelets 53 or other attaching means which may be interconnected by a rope or a chain (not shown). Thus, some of the towing force is transmitted directly to the frame 3 rather than through the boat itself.

The present assembly will support a boat firmly and rigidly in transit and may be readily removed by unscrewing clamp 45 and loosening the sling 11 at buckles 15. When removed, the U-shaped frame 3 can be collapsed or folded together, and requires so little storage space that the entire assembly may be stored aboard the boat or in the trunk of the towing vehicle. The boat may be loaded while it is in the water by placing the frame in position, passing the sling 11 under the boat bottom and tightening the straps.

Where desirable, the towing attachment 2 may be secured to the rear of the boat and frame 3 mounted forwardly of the center of gravity X so that the boat may be towed stern first. Also, depending upon the size of the boat and other conditions, it is sometimes desirable to employ two or more supporting assemblies 1 spaced along the length of the boat.

Figure 5:
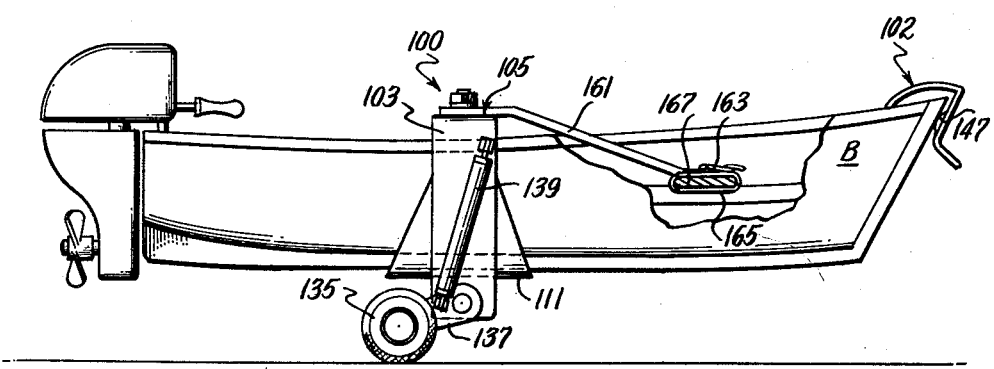
FIG. 5 is an elevational view similar to that of FIG. 1, showing here another embodiment of the invention.

In the embodiment shown in FIG. 5, the same basic structural elements are employed and have been given similar numerals in the 100 series. In this instance, however, a bar 161 is attached to the top of bight portion 105 extending longitudinally forwardly therefrom and downwardly and terminating in a flat member 163. A strap 165 or other connecting means, is suitably secured to the member 163 and fastened about an adjacent portion of the boat structure such as seat 167. It will readily be seen that bar 161 thus prevents any rotation of the frame 103 with respect to the boat B, as might be caused by any tendency of the wheels 135 to lag during towing.

Figure 6:
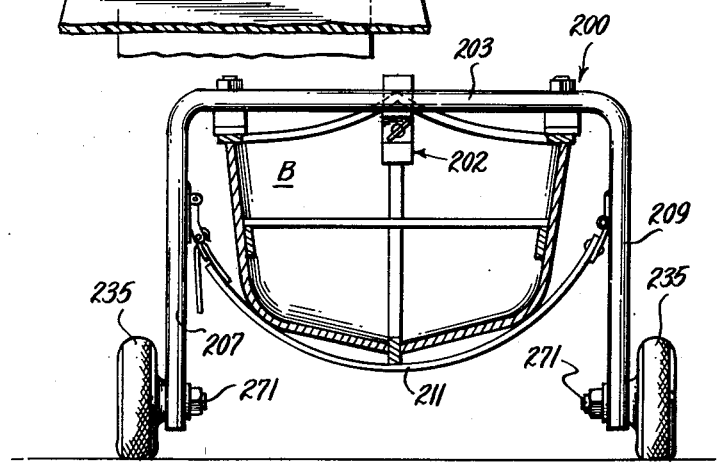
FIG. 6 is a sectional view similar to that of FIG. 2 showing here still another embodiment of the invention.

In the embodiment of FIG. 6, there is shown a simplified form of the boat trailer. Again the over-all arrangement is similar and like elements in the construction have been given the same numerals in the 200 series. In this construction, the frame 203 is formed of an integral member which may be tubular, channel shaped, or flat in cross-section. The wheels 235, in this instance, are mounted directly on the legs 207 and 209 by axle 271.

It will be understood that the wheels may be mounted on either of the embodiments in any suitable manner in accordance with the desired results. In the present instance, no spring means or shock-absorber means are employed whatsoever, but where such a suspension is desired it may be effected by any conventional type of spring assembly or shock-absorber assembly, or by utilizing wheels or tires which are inherently resilient in construction.

It will also be understood that numerous other changes and modifications may be made in the manners of use, the materials employed, and the particular construction and arrangement of elements without departing from the spirit of the invention or the scope of the annexed claims.

I claim:

1. In combination: a boat; a frame member of inverted U-shape straddling said boat centrally along the length thereof, said frame member including a transverse bight portion having legs depending from either end thereof; ground-engaging wheels mounted at the lower end of each of said legs; flexible sling means secured at its opposite ends to the respective legs of said frame at points spaced below said bight portion, said sling means passing under and supporting said boat; means for tightening said sling means to hold said boat against the underside of said bight portion; a towing attachment removably secured to the front end of said boat independently of said frame member to connect said boat to a towing vehicle; and means provided on said frame member and on said towing attachment for securing therebetween a flexible line to transmit a portion of the towing force.

2. In combination: a boat; a frame member of inverted U-shape straddling said boat centrally along the length thereof, said frame member including a transverse bight portion having legs depending from either end thereof; ground-engaging wheels mounted at the lower end of each of said legs; flexible sling means secured at its opposite ends to the respective legs of said frame at points spaced below said bight portion, said sling means passing under and supporting said boat; and a connecting member rigidly mounted on said frame member centrally of said bight portion and extending longitudinally of said boat for attachment thereto at a point spaced from said frame member and intermediate the ends of said boat.

References Cited in the file of this patent
UNITED STATES PATENTS

| | | |
|---|---|---|
| 1,939,863 | Seiter | Dec. 19, 1933 |
| 2,042,598 | Harvey | June 2, 1936 |
| 2,388,870 | Sackett | Nov. 13, 1945 |
| 2,494,110 | Stiller | Jan. 10, 1950 |
| 2,893,580 | Fischer | July 7, 1959 |

FOREIGN PATENTS

| | | |
|---|---|---|
| 497,777 | France | Sept. 24, 1919 |
| 449,374 | Germany | Sept. 16, 1927 |